US012540675B2

(12) United States Patent
Stegmann et al.

(10) Patent No.: US 12,540,675 B2
(45) Date of Patent: Feb. 3, 2026

(54) SEALING RING, HUB CAP SYSTEM, WHEEL CAP SYSTEM AND VEHICLE

(71) Applicant: SAF-HOLLAND GmbH, Bessenbach (DE)

(72) Inventors: Rainer Stegmann, Hösbach (DE); Muhammet Arpaci, Hösbach (DE); André Katzke, Weibersbrunn (DE); Elmar Weber, Dülmen (DE); Simon Schäfers, Nidderau-Erbstadt (DE); Daniel Müller, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 13 days.

(21) Appl. No.: 18/559,446

(22) PCT Filed: Aug. 24, 2022

(86) PCT No.: PCT/EP2022/073589
§ 371 (c)(1),
(2) Date: Nov. 7, 2023

(87) PCT Pub. No.: WO2023/025850
PCT Pub. Date: Mar. 2, 2023

(65) Prior Publication Data
US 2024/0240715 A1    Jul. 18, 2024

(30) Foreign Application Priority Data
Aug. 26, 2021   (DE) .................... 10 2021 122 136.6

(51) Int. Cl.
*F16J 15/32* (2016.01)
*F16J 15/3232* (2016.01)
*F16J 15/3284* (2016.01)

(52) U.S. Cl.
CPC ....... *F16J 15/3232* (2013.01); *F16J 15/3284* (2013.01)

(58) Field of Classification Search
CPC .... F16J 15/3232; F16J 15/3284; F16J 15/322; F16J 15/3268; F16J 15/3216
See application file for complete search history.

(56) References Cited

U.S. PATENT DOCUMENTS 3,578,343 A * 5/1971 Taschenberg ........... F16G 13/07
277/408
4,976,444 A * 12/1990 Richards ............... F04D 29/167
277/944

(Continued)

FOREIGN PATENT DOCUMENTS

CN    201795048 U    4/2011
CN    110630743 A    12/2019

(Continued)

OTHER PUBLICATIONS

European Patent Office; International Search Report; Oct. 26, 2022; entire document.

*Primary Examiner* — Christine M Mills
*Assistant Examiner* — L. Susmitha Koneru
(74) *Attorney, Agent, or Firm* — Price Heneveld LLP

(57) ABSTRACT

A sealing ring includes a retaining region, a primary sealing lip and a secondary sealing lip, wherein the retaining region is formed circumferentially about an axial direction, wherein a radial direction extends radially and perpendicularly away from the axial direction, and wherein the primary sealing lip and the secondary sealing lip have an extension in the radial direction, in particular in the positive radial direction.

19 Claims, 3 Drawing Sheets

(56) References Cited

U.S. PATENT DOCUMENTS

| | | | | |
|---|---|---|---|---|
| 5,161,943 | A * | 11/1992 | Maier | F01D 11/02 277/412 |
| 5,190,440 | A * | 3/1993 | Maier | F04D 29/162 277/412 |
| 5,403,019 | A * | 4/1995 | Marshall | F04D 29/122 277/413 |
| 6,609,716 | B2 * | 8/2003 | Friend | F16J 15/3232 277/552 |
| 7,592,798 | B2 * | 9/2009 | Yabe | G01P 3/443 324/174 |
| 7,731,427 | B2 * | 6/2010 | Torii | G01P 3/443 384/544 |
| 10,093,126 | B2 * | 10/2018 | Weigand | B60B 7/08 |
| 10,520,036 | B2 * | 12/2019 | Ishida | F16C 33/7823 |
| 11,193,389 | B2 * | 12/2021 | Siw | F01D 11/003 |
| 11,873,901 | B2 * | 1/2024 | Cognolato | F16J 15/3284 |
| 2007/0152657 | A1 * | 7/2007 | Yabe | G01P 3/487 324/174 |
| 2008/0159675 | A1 * | 7/2008 | Torii | F16C 41/007 384/448 |
| 2014/0225332 | A1 * | 8/2014 | Baart | F16J 15/3264 277/549 |
| 2017/0036481 | A1 * | 2/2017 | Weigand | B60B 7/0013 |
| 2019/0024800 | A1 * | 1/2019 | Baart | F16J 15/3264 |
| 2019/0107154 | A1 * | 4/2019 | Ishida | F16C 33/7883 |
| 2020/0132196 | A1 * | 4/2020 | Davis | F01D 25/183 |
| 2021/0115812 | A1 * | 4/2021 | Siw | F01D 11/003 |
| 2021/0381599 | A1 * | 12/2021 | Cognolato | F16J 15/3284 |
| 2022/0025776 | A1 * | 1/2022 | Sawyers-Abbott | F01D 25/12 |
| 2024/0157723 | A1 * | 5/2024 | Müller | F16J 15/106 |
| 2024/0157724 | A1 * | 5/2024 | Arpaci | B60B 7/0013 |

FOREIGN PATENT DOCUMENTS

| | | |
|---|---|---|
| DE | 2731886 A1 | 1/1978 |
| DE | 102017113391 A1 | 6/2017 |
| EP | 1489320 A1 | 12/2004 |

* cited by examiner

SEALING RING, HUB CAP SYSTEM, WHEEL CAP SYSTEM AND VEHICLE

BACKGROUND

The invention relates to a sealing ring, a hub cap system for attachment to a wheel hub of a vehicle, a wheel cap system comprising a wheel hub and a hub cap system, and a vehicle, in particular a commercial vehicle.

Among other things, hub cap systems have the task of protecting an inner area of a wheel and/or a wheel hub against the ingress of foreign bodies or particles and/or liquids, e.g. dirt or moisture. In order to achieve a better sealing effect, it is known from the prior art to provide sealing rings between the hub cap and the wheel hub to improve a seal against the penetration of foreign bodies. However, if the wheels are equipped with a tire pressure regulation system, the sealing effect achieved can potentially be unfavorable if compressed air enters the wheel hub, for example due to leakage in the supply lines of the tire pressure regulation system. If the interior of the wheel hub is sealed to the outside, this can lead to a buildup of excess pressure, which in turn can cause damage to the hub system or even cause the hub cap to be lost or detached.

It is therefore an object of the invention to provide a sealing ring as well as a corresponding hub cap system with which, with sufficient sealing against the ingress of dirt or moisture, pressure compensation of the interior pressure in the wheel hub is possible in a simple manner and which enable assembly that is as simple and inexpensive as possible.

SUMMARY OF THE INVENTION

According to the invention, a sealing ring comprises a retaining region, a primary sealing lip and a secondary sealing lip, wherein the retaining region is formed circumferentially about an axial direction, wherein the radial direction extends radially and perpendicularly away from the axial direction, wherein the primary sealing lip and the secondary sealing lip have an extension in the radial direction, in particular in a positive radial direction. The axial direction designates in particular a direction perpendicular to the surface spanned by the sealing ring. The axial direction or the central axis preferably runs through the center point of the sealing ring. The radial direction runs in particular from the center point or center axis of the sealing ring radially outward and/or perpendicular to the axial direction. In this context, a positive radial direction may be understood to mean a direction that extends radially outward from the center point or center axis of the sealing ring, while a negative radial direction may be understood to mean a direction that points radially from the outside towards the center point or center axis of the sealing ring. The sealing ring may have a substantially constant cross-section and/or a cross-section that is predominantly constant or constant in sections, in particular in a direction transverse to the axial direction and transverse to the radial direction. In this context, substantially constant means in particular that the sealing ring has a constant cross-section apart from deviations due to the design. Predominantly constant or constant in sections can mean that the sealing ring has a substantially constant cross section, but deviates from this constant cross section in places, e.g. by at least one aperture. Advantageously, the sealing ring may be formed in one piece. A one-piece design can enable a particularly reliable sealing effect and, if necessary, prevent assembly errors due to incorrect assembly. For example, the sealing ring can be elastically tightened at the location of its intended use. The sealing ring has a retaining region, wherein the retaining region in particular comprises an abutment region of the sealing ring, for example against a hub cap and/or against a wheel hub, and/or is designed to abut against, for example, a hub cap and/or against a wheel hub. Particularly preferably, the sealing ring is configured to be used for a hub cap and/or a hub cap system. The retaining region may be a base body, which constitutes the majority of the mass and/or volume of the sealing ring. The retaining region may have an approximately rectangular cross-section, and/or wherein, for example, the corners of the retaining region may be rounded, and/or wherein the retaining region may deviate from the rectangular cross-sectional shape on a side where the primary sealing lip and/or the secondary sealing lip is/are arranged or formed and/or adjacent to the retaining region. The retaining region and/or the sealing ring can comprise recesses, depressions and/or openings or bores, which can serve in particular for the conduction and/or retention of air. The retaining region is arranged circumferentially about an axial direction and/or about a central axis of the sealing ring. The primary sealing lip and/or the secondary sealing lip may adjoin the retaining region. Alternatively, the primary sealing lip and/or the secondary sealing lip may be spaced from the retaining region. For example, a transition region may be provided between the retaining region and the primary sealing lip and/or the secondary sealing lip. Preferably, the primary sealing lip and/or the secondary sealing lip can be of elastic design. Expediently, the retaining region, the secondary sealing lip and/or the primary sealing lip is made of the same material. Advantageously, the retaining region is materially bonded to the primary sealing lip and/or the secondary sealing lip, wherein a particularly high mechanical load-bearing capacity and sealing effect can be achieved. A specified extension of the primary sealing lip and the secondary sealing lip can refer in particular to a relaxed, i.e. in particular non-elastically deformed, state of the sealing lips. An extension of the primary sealing lip and/or the secondary sealing lip refers in particular to an extension along the main extension or the longest extension of the respective sealing lip. Preferably, the extension of the primary sealing lip and/or the secondary sealing lip is to be understood as referring to the orientation of the primary sealing lip and/or the secondary sealing lip. In particular, the extension may correspond to a longitudinal extension. In this context, the longitudinal extent is in particular the extent along which the sealing lip has its greatest extent or expansion. The primary sealing lip and/or the secondary sealing lip can extend proportionally in a further direction in addition to the radial direction, e.g. in the axial direction. Accordingly, the extension of the primary sealing lip and/or the secondary sealing lip has at least one component in the radial direction. Optionally, the extension of the primary sealing lip and/or the secondary sealing lip may have a further component in another direction. For example, the primary sealing lip and/or the secondary sealing lip may extend obliquely to the radial direction. A direction of extension of the primary sealing lip and/or the secondary sealing lip is thereby dimensioned or defined in particular from its attachment to the other components of the sealing ring, in particular the retaining region, to its distal end. An extension in the positive direction can mean that the primary sealing lip and/or the secondary sealing lip extends radially outward from its attachment to the sealing ring away from the center point of the sealing ring or the axial direction or the center axis of the sealing ring. In particular, a distal end of the primary sealing lip and/or the secondary sealing lip may be further away from the center point of the sealing ring or the axial direction, respectively, than the shoulder of the primary sealing lip and/or the secondary sealing lip. The primary sealing lip may represent the distal end of the sealing ring in a first direction, in particular in the radial direction, and/or the secondary sealing lip may represent the end of the sealing ring in a second direction, in particular in a direction substantially perpendicular to the first direction, preferably parallel to the axial direction, and/or extend to the end of the sealing ring in the second direction. For example, the primary sealing lip may be configured to prevent foreign bodies, in particular dirt and/or water, from entering an interior, for example of a wheel hub and/or a wheel. The secondary sealing lip can be designed to prevent the penetration of foreign bodies, in particular dirt and/or water, into the interior, in particular at a pressure in the interior which is below a predetermined threshold pressure. In addition, the secondary sealing lip can be designed to allow pressure to be released by flexing back in the event of excess pressure in the interior above the predetermined threshold pressure. The bending back of the secondary sealing lip can be conditioned in particular by the pressure in the interior. In other words, the secondary sealing lip can be designed to provide a sealing effect at normal pressure and to enable overpressure compensation by flexible bending back when a pressure threshold is exceeded. The sealing effect of the primary sealing lip and/or the secondary sealing lip can be achieved in particular by contact of the primary sealing lip and/or the secondary sealing lip with a surface, for example a hub cap and/or a wheel hub. Advantageously, the sealing ring according to the invention can be used, for example, to prevent the ingress of dirt and/or water on the one hand, in particular through the primary sealing lip, and on the other hand, if necessary, to allow venting of excess pressure, e.g. leakage pressure, from an interior, in particular through the secondary sealing lip.

Advantageously, the primary sealing lip and/or the secondary sealing lip can extend from the retaining region. In other words, the primary sealing lip and/or the secondary sealing lip can directly adjoin the retaining region. This can result in a particularly simple and compact design of the sealing ring.

Advantageously, the primary sealing lip and/or the secondary sealing lip and/or the retaining region and/or the sealing ring can be made of rubber and/or of a plastic, in particular to a predominant part. Advantageously, the sealing ring can be made entirely of rubber and/or of a plastic. To a predominant part can mean here that the sealing ring comprises, for example, a, in particular outer, protective layer and/or an inclusion and/or an outer additive made of another material. Alternatively or additionally, the sealing ring may comprise an admixture of another material. To a predominant part may in particular mean that the sealing ring is formed of more than 50 percent, preferably more than 80 percent, of rubber and/or of a plastic. If other materials are added so that the sealing ring consists of more than 50 percent rubber and/or a plastic, the sealing ring can have particularly good stability and/or particularly good protection against environmental influences. A design consisting of more than 80 percent rubber and/or a plastic can provide particularly good elasticity and/or tightness of the sealing ring. A complete design made of rubber and/or a plastic can furthermore enable relatively inexpensive and/or simple manufacture.

Advantageously, a receiving space can be provided between the secondary sealing lip and the retaining region, wherein the receiving space is formed in particular rotationally symmetrically around the axial direction. The receiving space can preferably be a recess or setback, in particular on a side of the sealing ring whose normal runs in the axial direction. The recess or setback can be designed to form, together with the secondary sealing lip and with a surface against which the secondary sealing lip bears in the installed state or against which the secondary sealing lip bears at normal pressure, an outwardly sealed space, wherein the space can have a connection into an inner space sealed by the sealing ring. The receiving space or recess or setback may have a round, in particular semicircular, cross-sectional profile in a direction transverse to the axial direction and transverse to the radial direction. The receiving space can in particular adjoin the extension of the secondary sealing lip at least in sections, preferably completely. Due to the volume of the receiving space, it can be achieved in particular that the pressure acts as uniformly as possible on the secondary sealing lip, in particular as seen in the circulation direction of the sealing ring. In addition or alternatively, it can be made possible for the pressure to act on the entire extent of the secondary sealing lip or at least on a large part of the extent of the secondary sealing lip. Advantageously, the receiving space can in particular enable a particularly reliable pressure equalization function of the secondary sealing lip. A design, in particular one that is rotationally symmetrical, all the way around the sealing ring can also make for particularly simple production.

Advantageously, the primary sealing lip can project beyond the secondary sealing lip in the radial direction. Advantageously, the secondary sealing lip can thus provide a seal radially on the outside or at a distal end in the positive radial direction. For example, the sealing ring can be used for a hub cap that has a mounting area and/or axially extending engagement elements for engaging a wheel hub by arranging the sealing ring in the radial direction between an outer part of the wheel hub and the mounting area or the engagement elements. Thus, the primary sealing lip can seal an inner space of the wheel hub or wheel by its radial position. The secondary sealing lip, on the other hand, can assume the function of a pressure release valve by means of an elastic design.

Advantageously, the primary sealing lip and/or the secondary sealing lip may extend in the axial direction and in the radial direction. In other words, the primary sealing lip and/or the secondary sealing lip may extend obliquely to the axial direction and to the radial direction. This type of extension may allow the primary sealing lip to be in particularly good sealing contact with a surface, such as a wheel hub. This type of extension can enable the secondary sealing lip to be used particularly well for releasing excess pressure, in particular when it bears against a surface whose normal runs parallel to the axial direction, wherein it can bear sealingly against the surface below a predetermined pressure value. Advantageously, the primary sealing lip and/or the secondary sealing lip can extend substantially equally in the axial direction and in the radial direction, wherein "substantially" can mean a deviation of at most 10 percent from a similar extension in these two directions. It has been found that such a uniform design can, on the one hand, achieve a particularly good sealing effect and, on the other hand, that opening of a venting path can be achieved by elastic bending of the secondary sealing lip with only a small bending, in particular smaller in comparison with a non-slanting orientation.

Advantageously, it can be provided that the primary sealing lip and the secondary sealing lip are designed to extend in the same direction. In other words, the main extension directions of the primary sealing lip and the secondary sealing lip can be aligned parallel to each other. This can represent a particularly simple and simultaneously effective embodiment for a seal.

Advantageously, the retaining region can have a bottom surface, wherein the bottom surface preferably faces coaxially to the axial direction and/or preferably facing the center axis of the sealing ring, wherein a channel running around the axial direction can advantageously be formed in the bottom surface. The channel can preferably be semicircular in cross-section and/or have a substantially constant cross-section along its course. The bottom surface may be formed or arranged opposite the side of the sealing ring or retaining region to which the primary sealing lip adjoins and/or to which the secondary sealing lip adjoins. Advantageously, the channel can facilitate the assembly of the sealing ring and/or increase the sealing effect of the sealing ring. In particular, the channel may be designed to be in fluid contact with an interior to be sealed by the sealing ring. Advantageously, the air can be guided in the channel and, in particular, can be guided from the channel to the secondary sealing lip. The channel can thus enable particularly uniform and reliable venting.

Advantageously, the sealing ring can have an aperture. In particular, the aperture can be designed to provide a venting path or air path from an interior sealed by the sealing ring to the secondary sealing lip. The aperture may be cylindrical in shape. Preferably, the sealing ring may have a plurality of apertures, wherein the apertures are distributed uniformly on the sealing ring, in particular circumferentially. Advantageously, the aperture can serve to connect a sealed interior with the secondary sealing lip and/or an area adjacent to the secondary sealing lip.

Advantageously, the aperture can open into the bottom surface and/or the channel. The aperture can thus serve, in particular in conjunction with the channel, to direct the air, in particular to provide a venting path in the event of excess pressure in the sealed interior.

Advantageously, the aperture may open into the receiving space. The aperture can allow a fluid connection from the interior to the receiving space. Advantageously, in this case, the receiving space can allow uniform distribution of the air that may be under pressure. In the event of an overpressure, the secondary sealing lip can be automatically elastically bent back to release a venting path, wherein the release can be reliably adjusted in particular by the uniform distribution by means of the receiving space. The aperture designed in this way can thus represent a way of providing a venting path through the sealing ring itself. Since it is preferably only a single aperture or only a few apertures that are involved, the stability of the sealing ring in particular is not too severely impaired as a result.

Advantageously, the aperture can extend in the axial direction and/or in the radial direction. Extending in the axial direction and in the radial direction can advantageously allow air, for example, to be conducted from a region of the sealed inner space that is located further inwards, as seen in the axial direction and/or in the radial direction, to an outer region of the sealing ring, as seen in the axial direction and in the radial direction. Furthermore, a transmission of pressure surges from the interior directly to the secondary sealing lip can be prevented, which may allow a more uniform pressure regulation of the interior.

Advantageously, the primary sealing lip and/or the secondary sealing lip can be formed to extend completely around the axial direction. In particular, a cross-section transverse to the axial direction and the radial direction of the primary sealing lip and/or the secondary sealing lip can be formed to be constant. A complete formation extending around the axial direction may allow easy manufacturing. In addition, the sealing ring and/or the primary sealing lip and/or the secondary sealing lip can thus be particularly mechanically loadable. Furthermore, by running completely around, a uniform release of overpressure can be realized.

According to a further aspect of the invention, there is provided a hub cap system for attachment to a wheel hub of a vehicle, in particular a commercial vehicle, comprising a hub cap and a sealing ring as described herein. A commercial vehicle within the meaning of the invention is, in particular, a vehicle having a gross vehicle weight of more than 3.5 t, preferably of more than 7.5 t and particularly preferably of more than 18 t. The commercial vehicle may in particular be a roadworthy vehicle and/or a road-bound vehicle. Preferably, such a commercial vehicle may be a trailer, in particular a semi-trailer. All the advantages and features of the sealing ring can be transferred analogously to the hub cap system and vice versa. The sealing ring according to the invention can serve for venting an inner space of the wheel hub or of a wheel in case of overpressure, in particular by means of the secondary sealing lip, wherein the sealing ring simultaneously provides protection of the interior against dirt and/or water or other liquids, in particular by means of the primary sealing lip and/or the secondary sealing lip.

Advantageously, the hub cap can have a fastening region, in particular a groove, wherein the fastening region advantageously runs around the axial direction or center axis of the sealing ring, and/or wherein optionally the fastening region is advantageously formed pointing away from the axial direction or a center axis of the sealing ring, and wherein the sealing ring, in particular the retaining region of the sealing ring, is arranged on or in the fastening region. Pointing away from the axial direction can mean in particular that the fastening region is arranged on a side of the hub cap facing in the positive radial direction. The fastening region, in particular the groove, can advantageously serve to stabilize the arrangement of the sealing ring or ensure or facilitate the correct arrangement of the sealing ring during installation.

Advantageously, the hub cap can have or at least partially enclose an interior, wherein the hub cap has at least one connecting aperture, wherein the connecting aperture connects the aperture, the channel or the receiving space to the interior. The connecting aperture can in particular be designed as an air passage. Advantageously, a venting path can thus be specified by the connecting aperture, which is released when the secondary lip is elastically bent back into the interior in the event of overpressure. In the event of excess pressure, the air can flow selectively through this venting path, i.e. through the connecting aperture and—if present—optionally through the aperture, the channel and/or the receiving space, and thus provide venting in the event of excess pressure. If there is no overpressure or if a pressure threshold value is not exceeded, i.e. in particular if venting is not necessary, protection of the interior is ensured by the secondary protection lip.

It is expedient that the secondary sealing lip can rest against or be applied to the hub cap. This thus represents a simple option in which the secondary sealing lip can protect the interior in the applied state. In particular, the secondary sealing lip can be configured to open a venting path for reducing the pressure in the interior by elastically bending away from the hub cap when a predetermined pressure value in the interior is exceeded, and to block the venting path by abutting against the hub cap below the predetermined pressure value. Preferably, the secondary sealing lip can abut against a surface of the hub cap, wherein the normal of the surface is oriented substantially parallel to the axial direction, wherein a deviation from a parallel orientation, in particular of at most 10°, preferably of at most 5°, can be understood as a substantially parallel. This represents a particularly efficient way of regulating the pressure in the interior, in particular taking advantage of the geometric conditions of the arrangement between the hub cap and the sealing ring. Advantageously, the secondary sealing lip can be oriented during contact in such a way that a point of contact of the secondary sealing lip with the hub cap, as seen in the radial direction, is further away from the center point of the hub cap and/or is arranged radially further out than an attachment of the secondary sealing lip to the sealing ring and/or to the retaining region of the sealing ring. In particular, this can cause the secondary sealing lip to extend at an angle, which can be particularly favorable for sealing and/or unblocking a venting path.

Advantageously, the sealing ring and/or the hub cap can be designed in such a way that the pressure applied on one side, in particular the side facing the axial direction, of the secondary sealing lip essentially corresponds to the pressure in the interior of the hub cap. In other words, fluid flow can occur from one side of the secondary sealing lip to the interior of the hub cap without the fluid having to leave or leaving the hub cap or the sealing ring for this purpose. The pressure acting on the secondary sealing lip can thus correspond to the pressure in the interior, making it possible to directly couple the behavior, in particular opening and closing, of the secondary sealing lip to the pressure in the interior.

Advantageously, the hub cap can have fastening means, in particular fastening fingers, for fixing the hub cap to a wheel hub. Preferably, the sealing ring and/or the fastening region can be arranged in the area of a connection of the fastening means to the hub cap. In this way, in particular, a particularly simple clamping of the sealing ring and thus sealing by the sealing ring can be achieved.

According to a further aspect of the invention, a wheel cap system comprising a wheel hub and a hub cap system as described herein is provided, wherein the primary sealing lip abuts or is abuttable against the wheel hub. All advantages and features of the sealing ring as well as the hub cap system can be transferred analogously to the wheel cap system and vice versa.

According to a further aspect of the invention, a vehicle, in particular a commercial vehicle, is provided comprising a sealing ring as described herein, a hub cap system as described herein or a wheel cap system as described herein. All advantages and features of the sealing ring, the hub cap system and the wheel cap system can be transferred analogously to the vehicle and vice versa.

Individual features and embodiments mentioned above may be combined with each other, and the advantages associated with the individual features also apply to a combination of these features.

BRIEF DESCRIPTION OF THE DRAWINGS

Further advantages and features of the invention will be apparent from the following description of preferred embodiments of the subject-matter of the invention with reference to the accompanying figures. The following description serves only to clarify the invention and should not be construed as limiting the appended claims to any of the embodiments. Showing

DETAILED DESCRIPTION

Figure 1:
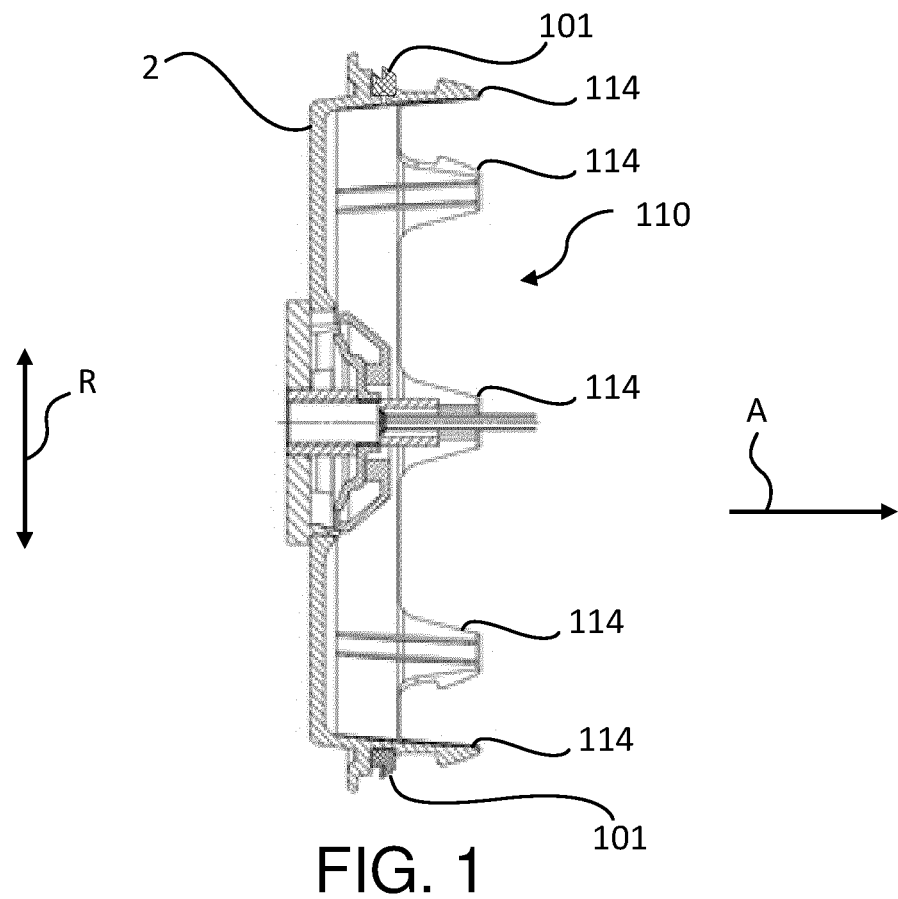
FIG. 1 is a sectional view of a hub cap system according to one embodiment of the invention.

FIG. 1 shows a sectional view of a hub cap system with a sealing ring 101 and a hub cap 2 according to one embodiment of the invention. The sealing ring 101 is arranged circumferentially around the hub cap 2 and is shown here in cross-section as well as in the following figures. The hub cap 2 includes a plurality of fastening means 114 for clamping to a wheel hub. By placing the hub cap 2 on the wheel hub, an interior 110 can be formed which can be sealed to the outside by means of the sealing ring 101.

Figure 2:
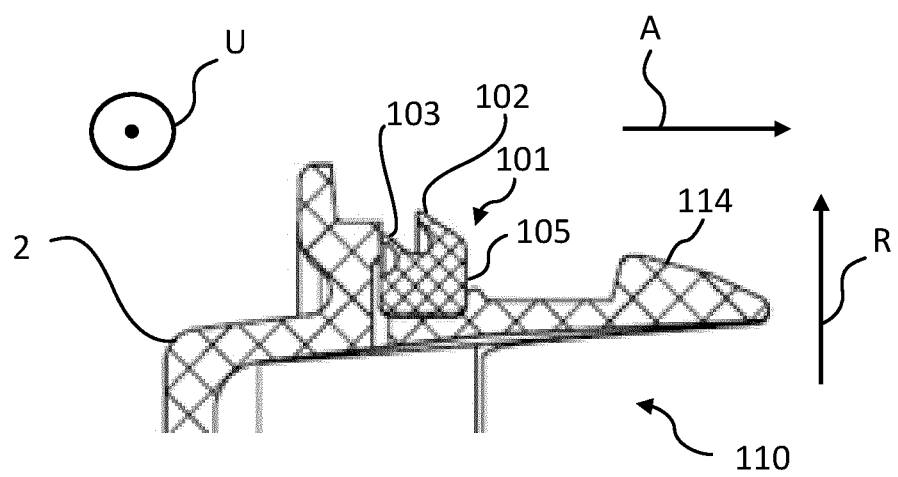
FIG. 2 is a sectional view of a sealing ring arranged on a hub cap, according to a first embodiment of the invention.
Figure 3:
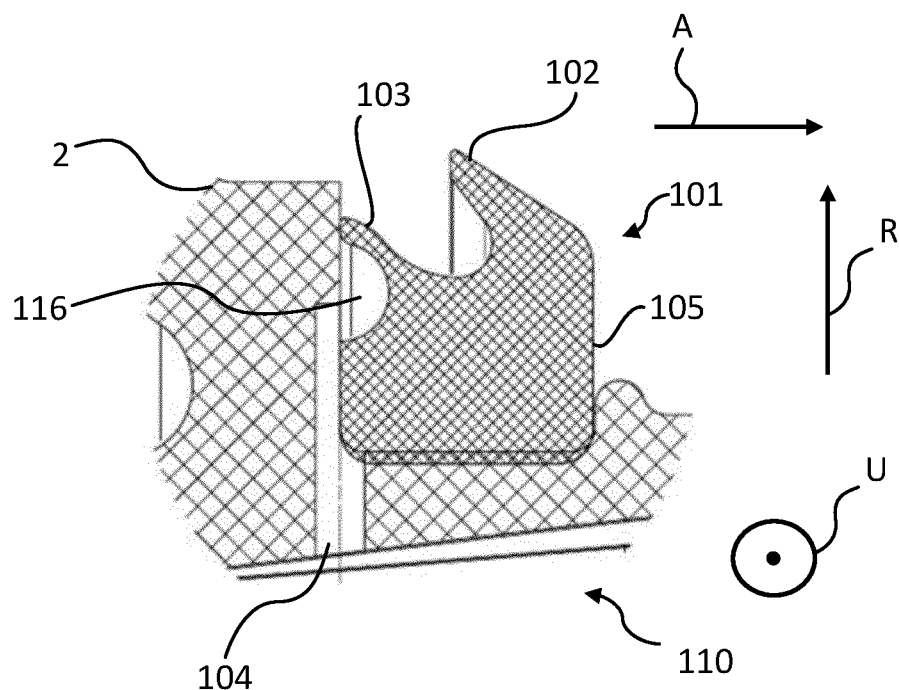
FIG. 3 is an enlarged sectional view of a sealing ring arranged on a hub cap, according to a first embodiment of the invention.

FIGS. 2 and 3 show a sectional view of a sealing ring 101 arranged on a hub cap 2, which is shown here in part, according to a first embodiment of the invention. The sealing ring 101 comprises a primary sealing lip 102 for abutting a wheel hub and a secondary sealing lip 103 abutting the hub cap 2. Both the primary sealing lip 102 and the secondary sealing lip 103 adjoin the retaining region 105 of the sealing ring 101 and extend therefrom in both the axial direction A and the radial direction R. In this embodiment, the retaining region 105 constitutes the main part of the sealing ring 101 and is arranged in a groove or on a fastening region of the hub cap 2. A receiving space 116 is arranged below the primary sealing lip 103 and enclosed by the primary sealing lip 103, the retaining region 105 and a side wall of the hub cap 2. The receiving space 116 is fluidly connected to the interior 110 formed by the hub cap 2 and a wheel hub by means of a connecting aperture 104 through the hub cap 2. Through the connecting aperture 104, an air conduit is provided from the interior 110 to the receiving space 116, whereby in particular the pressure in the receiving space 116 substantially corresponds to the pressure in the interior 110. If the pressure in the interior 110 now exceeds a predetermined maximum pressure, the secondary sealing lip 103 is elastically bent away upwardly or substantially in the positive radial direction R and a venting path is created via the connecting aperture 104, the receiving space 116 and past the secondary sealing lip 103. Air can pass outwardly from the interior 110 via this venting path until the pressure in the interior 110 is no longer above the predetermined maximum pressure. As soon as the pressure in the interior 110 is no longer above the maximum pressure, the secondary sealing lip 103 reconnects to the hub cap 2 and the venting path is closed again. In this state, in particular due to the sealing ring 101 and due to the sealing lips 102, 103, no dirt or liquids can enter the interior 110.

Figure 4:
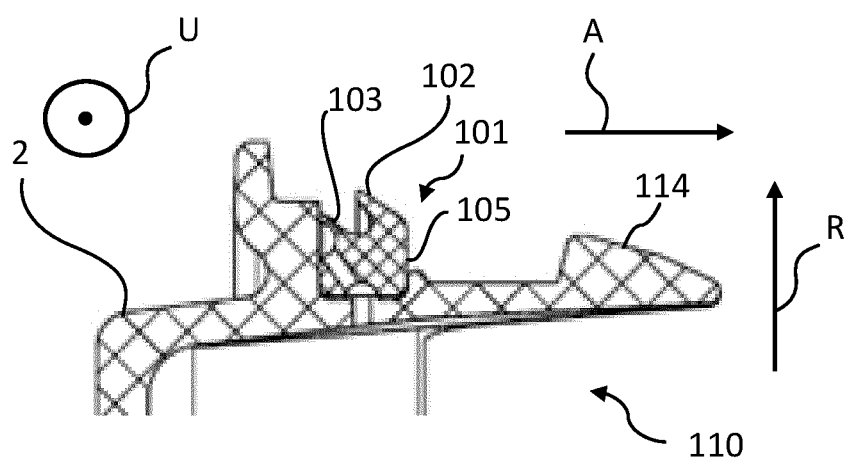
FIG. 4 is a sectional view of a sealing ring arranged on a hub cap, according to a second embodiment of the invention.
Figure 5:
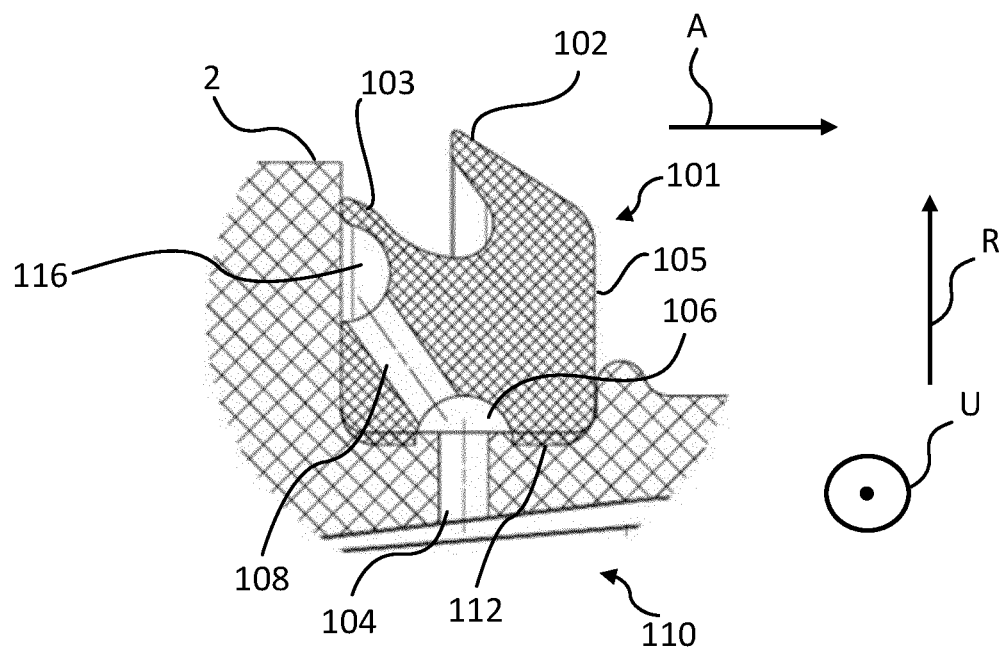
FIG. 5 is an enlarged sectional view of a sealing ring arranged on a hub cap according to a second embodiment of the invention.

FIGS. 4 and 5 show a sectional view of a sealing ring 101 arranged on a hub cap 2, which is shown here in parts. In this embodiment, the sealing ring 101 also has a primary sealing lip 102 and a secondary sealing lip 103 as well as a retaining region 105. In this embodiment, the sealing lip 101 also has one or more apertures 108 in the circulation direction U, one of which is shown in this sectional view. The aperture 108 extends in both the radial direction R and the axial direction A. It thus connects a channel 106, which is arranged in a floor space 112 of the sealing ring 101, to the receiving space 116, which is configured here in the same way as in the first embodiment shown in FIGS. 2 and 3. Both the channel 106 and the receiving space 116 have a constant cross-section in the circulation direction U. Thus, both are formed continuously and are selectively connected by the apertures 108. For connecting the channel 106 to the interior 110, the hub cap 2 has at least one connecting aperture 104. Via the connecting aperture 104, the channel 106, the aperture 108 and the receiving space 116, a venting path can be opened when the secondary sealing lip 103 is elastically bent back in the event of overpressure in the interior 110 and thus also in the receiving space 116. Below a nominal pressure value, on the other hand, the secondary sealing lip closes by abutting against the hub cap 2, while the primary sealing lip 102 also seals the interior 110 by abutting against a connected wheel hub not shown here. Thus, in an assembled system of hub cap 2, wheel hub and sealing ring 101, the sealing ring 101 can ensure that no foreign objects can enter the wheel hub or a wheel comprising the wheel hub from the outside.

Figure 6:
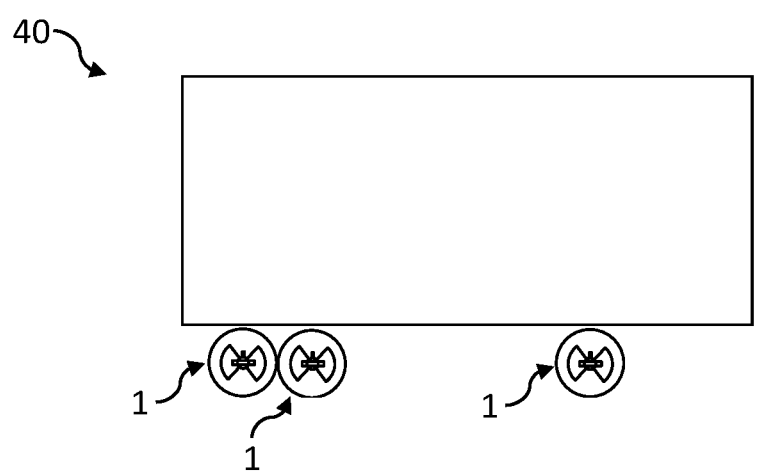
FIG. 6 is a schematic side view of a vehicle according to one embodiment.

FIG. 6 shows a vehicle 40, wherein said vehicle 40 comprises a plurality of hub cap systems 1 on its wheels. The hub cap systems 1 may in particular be provided in an embodiment according to the invention. The hub cap systems 1 may be part of a hub cap system according to the invention and/or comprise a sealing ring 101 according to the invention. In this case, the vehicle 40 is a trailer. A combination of different embodiments of hub cap systems on different wheels and/or axles of the vehicle 40 is also conceivable.

REFERENCE SIGN

1 Hub cap system
2 Hub cap
40 Vehicle
101 Sealing ring
102 Primary sealing lip
103 Secondary sealing lip
104 Connecting aperture
105 Retaining region
106 Channel
108 Aperture
110 Interior
112 Floor space
114 Fastening means
116 Receiving space
A Axial direction
R Radial direction
U Circulation direction

The invention claimed is:

1. A hub cap system configured to fasten to a wheel hub of a commercial vehicle, comprising:
a hub cap; and
a sealing ring that includes a retaining region, a primary sealing lip and a secondary sealing lip;
wherein the retaining region is formed circumferentially about an axial direction;
wherein the retaining region has a floor space;
wherein a channel is formed in the floor space circumferentially about the axial direction;
wherein a radial direction extends radially and away from the axial direction;
wherein the primary sealing lip and the secondary sealing lip have an extension in the radial direction;
wherein the hubcap has a fastening region, wherein the sealing ring is arranged on or in the fastening region, and wherein the fastening region is circumferential about the axial direction; and
wherein the hubcap comprises or at least partially encloses an interior and at least one connecting aperture, wherein the connecting aperture is configured to connect an aperture of the sealing ring, the channel or a receiving space to the interior, and wherein the connecting aperture is configured as an air passage.

2. The hub cap system according to claim 1, wherein a direction of extension of the primary sealing lip and the secondary sealing lip is dimensioned from the respective attachment of the primary sealing lip and the secondary sealing lip to the retaining region to a distal end of the respective primary sealing lip and secondary sealing lip.

3. The hub cap system according to claim 2, wherein a receiving space is provided between the secondary sealing lip and the retaining region, and
wherein the receiving space is formed rotationally symmetrically, circumferentially about the axial direction.

4. The hub cap system according to claim 3, wherein the primary sealing lip and/or the secondary sealing lip extend in the axial direction and in the radial direction.

5. The hub cap system according to claim 4, wherein the primary sealing lip and the secondary sealing lip are configured to extend in the same direction.

6. The hub cap system according to claim 5, wherein the sealing ring comprises the aperture.

7. The hub cap system according to claim 6, wherein the aperture opens into the floor space or the channel.

8. The hub cap system according to claim 6, wherein the aperture opens into the receiving space.

9. The hub cap system according to claim 1, wherein the fastening region includes a groove, and wherein the fastening region is formed pointing away from the axial direction.

10. The hub cap system according to claim 1, wherein the secondary sealing lip abuts or is configured to abut against the hub cap.

11. The hub cap system according to claim 1, further comprising:
the wheel hub,
wherein the primary sealing lip abuts against the wheel hub.

12. The hub cap system according to claim 1, wherein a receiving space is provided between the secondary sealing lip and the retaining region, and
wherein the receiving space extends rotationally symmetrically, circumferentially about the axial direction.

13. The hub cap system according to claim 1, wherein the primary sealing lip and/or the secondary sealing lip extend in the axial direction and in the radial direction.

14. The hub cap system according to claim 1, wherein the primary sealing lip and the secondary sealing lip are configured to extend in the same direction.

15. The hub cap system according to claim 1, wherein the sealing ring comprises the aperture.

16. The hub cap system according to claim 15, wherein the aperture opens into the floor space or the channel.

17. The hub cap system according to claim 15, wherein the aperture opens into the receiving space.

18. The hub cap system according to claim 1, wherein the radial direction is a positive radial direction.

19. A commercial vehicle, comprising a hub cap system according to claim 1.

* * * * *